United States Patent [19]

McGee et al.

[11] Patent Number: 5,785,779
[45] Date of Patent: Jul. 28, 1998

[54] PROTECTIVE TIRE LINER FOR A BICYCLE AND RELATED METHODS

[75] Inventors: Christopher McGee, Steamboat Springs, Colo.; Daniel R. Nietzold; Loronzo H. Thomson, both of Warner Robins, Ga.

[73] Assignee: L. H. Thomson Company, Inc., Macon, Ga.

[21] Appl. No.: 801,899

[22] Filed: Feb. 18, 1997

[51] Int. Cl.[6] .............................. B60C 19/12; B29D 30/06
[52] U.S. Cl. ...................... 152/204; 152/203; 156/110.1; 156/121; 156/123
[58] Field of Search ............................... 152/203–207, 152/195, 196, 450, 500, 511; 156/123, 110.1, 124, 130, 133, 121

[56] References Cited

U.S. PATENT DOCUMENTS

| | | |
|---|---|---|
| 866,009 | 9/1907 | Dreisbach . |
| 944,722 | 12/1909 | Eshelman . |
| 1,156,155 | 12/1915 | Landis . |
| 1,217,754 | 2/1917 | Grube . |
| 1,226,703 | 5/1917 | Schmidt . |
| 1,266,064 | 5/1918 | Sexton . |
| 1,297,408 | 3/1919 | Schuster . |
| 1,305,622 | 6/1919 | Rawdon et al. . |
| 1,309,249 | 7/1919 | Grube . |
| 1,346,632 | 7/1920 | Bennett . |
| 1,371,097 | 3/1921 | Jones . |
| 1,382,844 | 6/1921 | Mason . |
| 1,384,817 | 7/1921 | Baker ........................ 152/206 |
| 1,416,917 | 5/1922 | Wayne . |
| 1,445,606 | 2/1923 | Stewart . |
| 1,474,387 | 11/1923 | Schoneberger . |
| 1,656,832 | 1/1928 | Schäfer . |
| 1,672,008 | 6/1928 | Stiattesi . |
| 1,779,014 | 10/1930 | Schäfer et al. . |
| 1,812,710 | 6/1931 | Pappas ........................ 152/207 |
| 1,875,102 | 8/1932 | Morse . |

(List continued on next page.)

FOREIGN PATENT DOCUMENTS 2049573  12/1980  United Kingdom .................. 152/204

OTHER PUBLICATIONS

*Bicycle Retailer and Industry News*, vol. 4, No. 12, (Jul. 15, 1995), p. 22 "Tire Armor Uses Kevlar For Tire Liner".

Mr. Tuffy—The Next Generation tire liner product (1994).

*Primary Examiner*—Geoffrey L. Knable
*Attorney, Agent, or Firm*—Allen, Dyer, Doppelt, Milbrath & Gilchrist, P.A.

[57] ABSTRACT

A protective tire liner is positioned between the bicycle inner tube and the bicycle outer tire of a bicycle wheel. The tire liner includes a puncture-resistant flexible strip to protect the inner tube from puncture damage, and at least one covering layer on the puncture-resistant flexible strip to cover at least the side edges thereof. The puncture-resistant strip has a relatively abrasive surface especially at side edges thereof so as to be capable of abrading the inner tube upon relative motion. Accordingly, the covering layer prevents abrading of the inner tube which would otherwise occur. The protective liner protects the inner tube from puncture damage, such as from thorns, as are commonly encountered when mountain biking. In one embodiment, the at least one covering layer comprises a flexible plastic strip spirally wound about the puncture-resistant flexible strip. In another embodiment, the at least one covering layer may be provided by a pair of flexible plastic strips being folded around respective side edges and adjacent portions of the puncture-resistant strip. In yet another embodiment, the at least one covering layer comprises a pair of opposing first and second flexible plastic layers covering opposing major first and second surfaces of the puncture-resistant flexible strip, and with the pair of flexible plastic layers including respective outwardly extending portions which extend outwardly beyond side edges of the puncture-resistant strip and which are joined together. Method aspects of the invention are also disclosed.

20 Claims, 4 Drawing Sheets

U.S. PATENT DOCUMENTS

| | | | |
|---|---|---|---|
| 2,205,260 | 6/1940 | Hart | 152/205 |
| 2,234,403 | 3/1941 | Goodrich. | |
| 2,303,523 | 12/1942 | Baker. | |
| 3,982,577 | 9/1976 | Scimeca | 152/204 |
| 4,262,719 | 4/1981 | Price | 152/204 |
| 4,347,884 | 9/1982 | Price | 152/158 |
| 4,418,736 | 12/1983 | Vandenburgh | 152/354 R |
| 4,737,401 | 4/1988 | Harpell et al. | 428/252 |
| 4,868,040 | 9/1989 | Hallal et al. | 428/251 |
| 5,198,280 | 3/1993 | Harpell et al. | 428/102 |
| 5,343,796 | 9/1994 | Cordova et al. | 89/36.02 |
| 5,565,264 | 10/1996 | Howland | 428/229 |

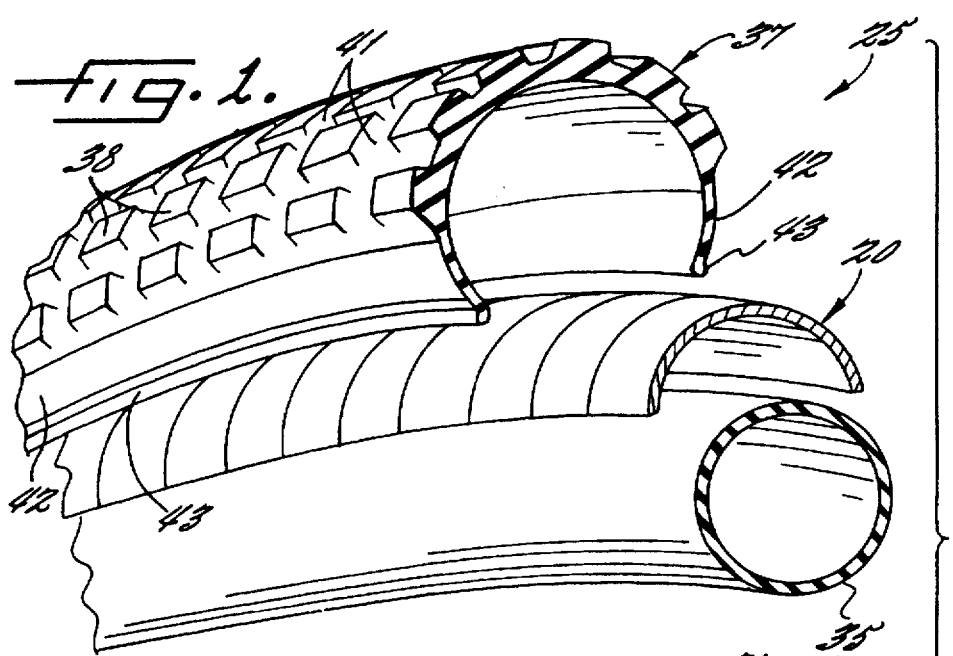
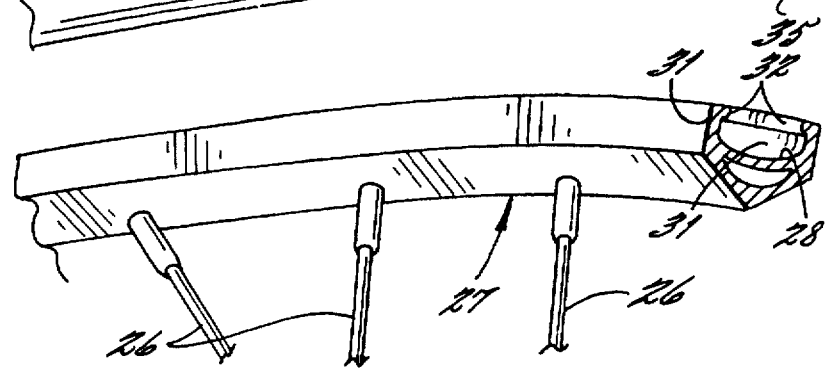
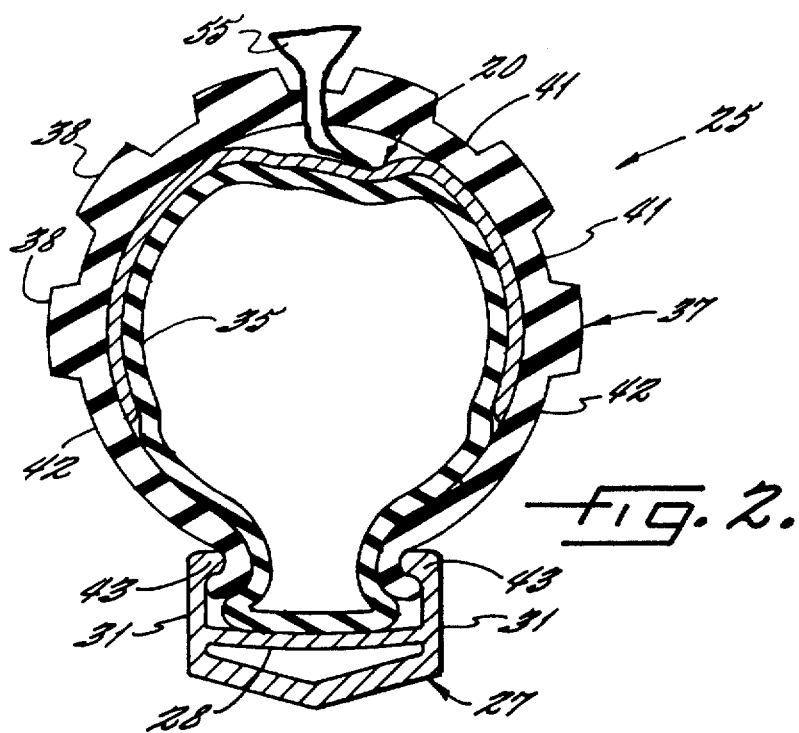

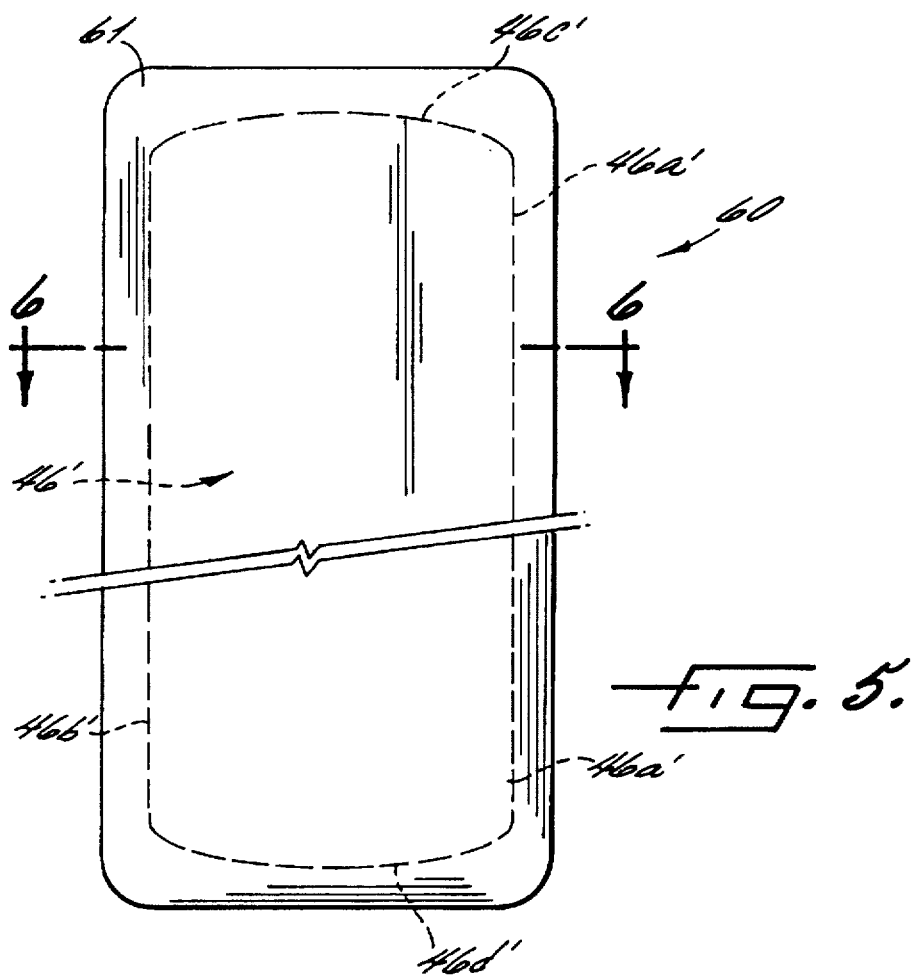
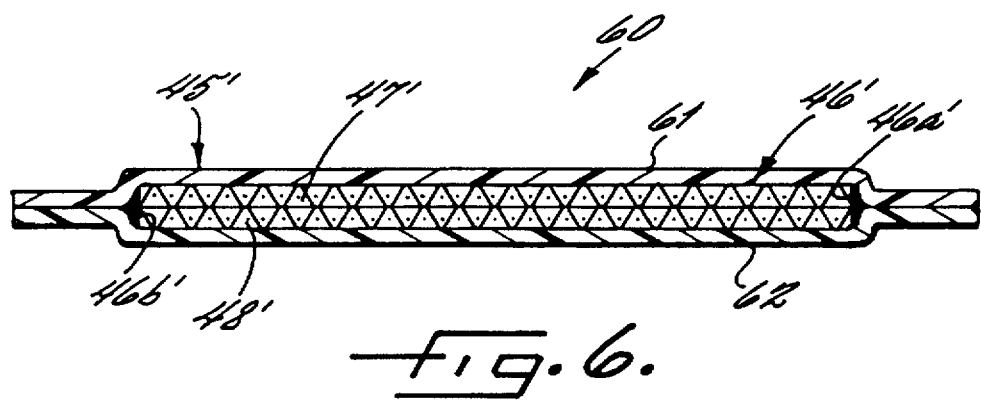

PROTECTIVE TIRE LINER FOR A BICYCLE AND RELATED METHODS

FIELD OF THE INVENTION

The present invention relates to the field of wheels and tires, and more particularly, to a protective liner for a bicycle tire.

BACKGROUND OF THE INVENTION

Like most bicycle wheels, a conventional mountain bike wheel includes a rim over which an inflatable inner tube is positioned. The rugged outer rubber tire is secured to the opposing edges or beads of the rim thereby enclosing the inner tube between the tire and the rim. Unfortunately, especially for mountain biking, thorns and other sharp objects may readily penetrate the outer tire and puncture the inner tube. In addition, the inner tube may be pinched against the rim edges by forceful contact between the wheel and a blunt object. Accordingly, flat tires are a common occurrence for many mountain bikers.

While there has been considerable development of protective liners for early automobile tires, there has been little development in the area of bicycle tires. For example, U.S. Pat. No. 2,234,403 to Goodrich discloses a protective liner for an automobile tire wherein the rubber encasing the reinforcing layers extends outwardly beyond the side edges of the reinforcing layers and gradually tapers down in thickness. U.S. Pat. No. 1,875,102 to Morse discloses a similar vehicle tire liner. Along these lines, U.S. Pat. No. 1,656,832 to Schafer discloses a strip-shaped tire liner wherein reinforcing layers are encased within an outer tricot fabric layer. In addition, there has been some more recent efforts at protecting a vehicle tire from a bullet, for example. United Kingdom published patent application 2,049,573 to Langton discloses a Kevlar bullet-resistant fabric layer positioned between the inner tube and outer tire for a vehicle.

In the area of high performance racing bicycle tires, U.S. Pat. No. 4,418,736 to Vandenburgh discloses a racing bicycle tire comprising a casing of untreated woven fabric in the form of a toroid about an inner tube, and wherein the threads of the fabric are in bias alignment. A polyurethane tread is secured about the periphery of the casing. Any strong synthetic fibers such as nylon, polyester, glass, or Kevlar may be used. The patent discloses that the lack of surface treatment is desirable since such a surface treatment may have a tendency to weaken the fibers.

Unfortunately, there still exists a need for a lightweight and effective device for protecting a bicycle tire, particularly, a mountain bicycle tire from punctures and other damage that cause flats.

SUMMARY OF THE INVENTION

In view of the foregoing background, it is therefore an object of the present invention to provide a protective tire liner for a bicycle tire that is effective, readily manufactured, and lightweight.

These and other objects, advantages and features of the present invention are provided by a protective tire liner positioned between the bicycle inner tube and the bicycle outer tire of a bicycle wheel, and wherein the protective tire liner comprises a puncture-resistant flexible strip to protect the inner tube from puncture damage, and at least one covering layer being positioned on the puncture-resistant flexible strip to cover at least the side edges thereof. The puncture-resistant flexible strip has a relatively abrasive surface especially at side edges thereof so as to be capable of abrading the inner tube upon relative motion. Accordingly, the at least one covering layer prevents abrading of the inner tube which would otherwise occur from relative motion with the puncture-resistant flexible strip.

The protective tire liner is for a bicycle wheel of a type including a generally circular bicycle rim, a bicycle inner tube positioned around the bicycle rim, and a bicycle outer tire covering the bicycle inner tube and secured to the bicycle rim. The protective tire liner protects the inner tube from puncture damage, such as from thorns, as are commonly encountered when mountain biking.

The at least one covering layer preferably comprises plastic. An adhesive may be used in some embodiments to secure the at least one covering layer to adjacent portions of the puncture-resistant layer. In one embodiment, the at least one one covering layer comprises a flexible plastic strip spirally wound about the puncture-resistant flexible strip. In another embodiment, the at least one covering layer may be provided by a pair of flexible plastic strips being folded around respective side edges and adjacent portions of the puncture-resistant strip.

In yet another embodiment, the at least one covering layer comprises a pair of opposing first and second flexible plastic layers covering opposing major first and second surfaces of the puncture-resistant flexible strip. In this embodiment, the pair of opposing first and second flexible plastic layers preferably comprise respective outwardly extending portions which extend outwardly beyond side edges of the puncture-resistant strip. These outwardly extending portions are joined together, such as using an adhesive or heat fusing the portions together.

The at least one covering layer may be provided by a plastic extruded layer. In addition, the puncture-resistant flexible strip also further defines opposing end edges. Accordingly, the at least one covering layer preferably includes portions covering at least one end edge of the puncture-resistant flexible strip positioned adjacent the inner tube.

The puncture-resistant strip is preferably formed from a plurality of tightly woven fabric layers arranged in stacked relation. Each fabric layer, in turn, preferably comprises multifilament yarn having a relatively high modulus and a relatively high breaking strength.

A method aspect according to the invention is for protecting a bicycle inner tube for a bicycle wheel comprising a generally circular bicycle rim, the bicycle inner tube positioned around the bicycle rim, and a bicycle outer tire covering the bicycle inner tube and secured to the bicycle rim. The method preferably comprises the steps of: forming a protective tire liner by providing a puncture-resistant flexible strip having a relatively abrasive surface especially at side edges thereof, and securing at least one covering layer on the puncture-resistant flexible strip to cover at least the side edges thereof to prevent abrading. The method also preferably includes the step of positioning the protective tire liner between the bicycle inner tube and the bicycle outer tire.

BRIEF DESCRIPTION OF THE DRAWINGS

FIG. 1 is an exploded perspective view of a bicycle wheel including an embodiment of a protective tire liner in accordance with the present invention.

FIG. 2 is an enlarged cross-sectional view taken through the assembled wheel portion illustrating the operation of the protective tire liner in accordance with the present invention.

FIG. 5 is a plan view of a second embodiment of a protective tire liner in accordance with the invention.

FIG. 6 is a cross-sectional view taken along lines 6—6 of FIG. 5.

DETAILED DESCRIPTION OF THE PREFERRED EMBODIMENTS

Figure 3:
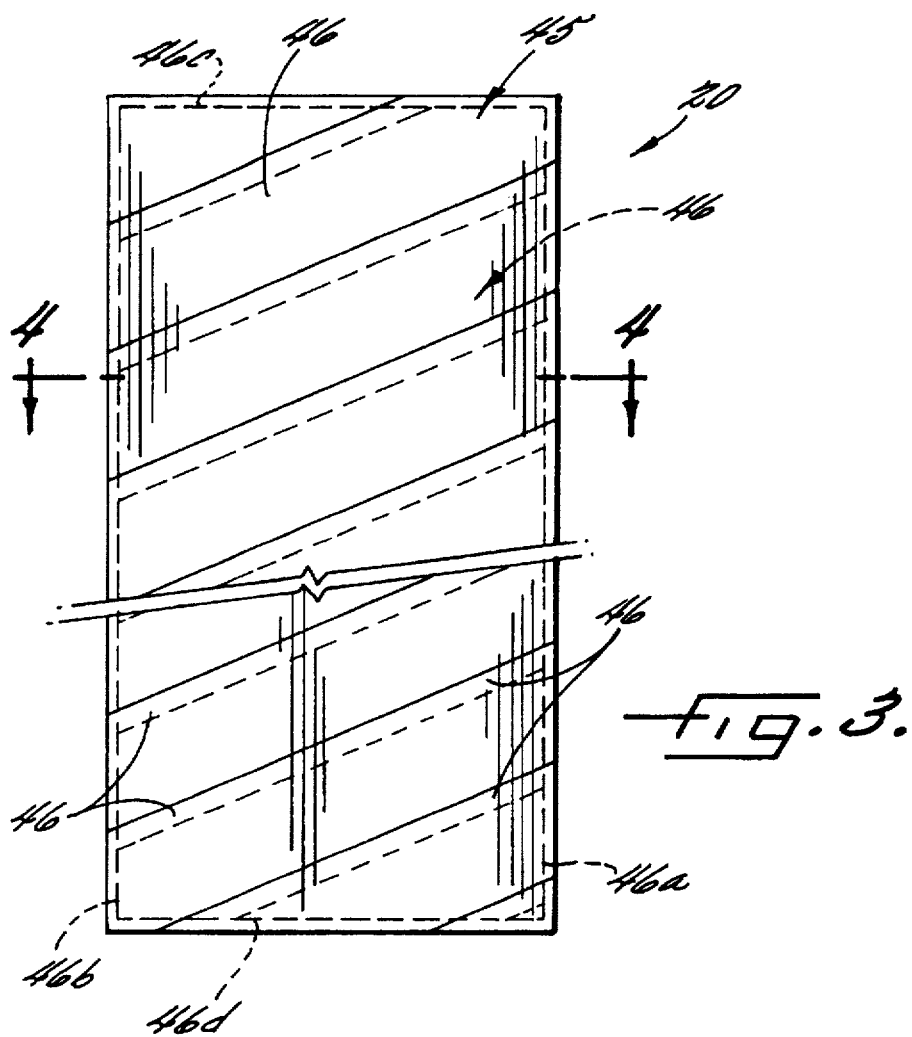
FIG. 3 is a plan view of one embodiment of a protective tire liner in accordance with the invention.
Figure 4:
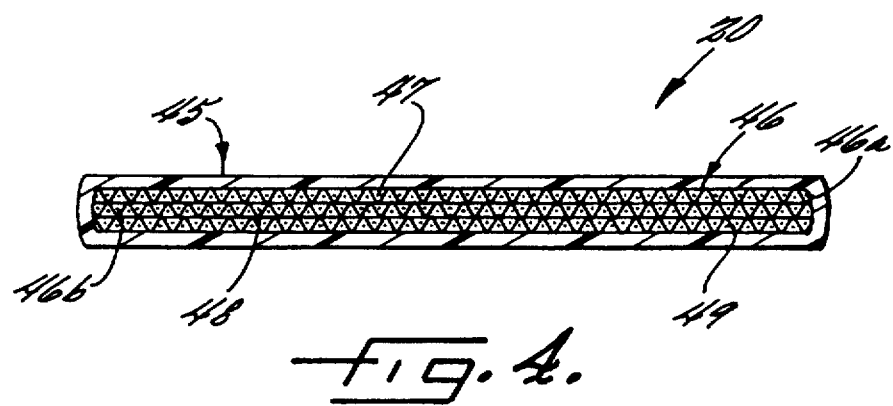
FIG. 4 is a cross-sectional view taken along lines 4—4 of FIG. 3.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and double prime notation are also used to indicate similar elements in alternate embodiments.

Referring initially to FIGS. 1-4, a first embodiment of the protective tire liner 20 in accordance with the invention is described. The tire liner 20 is for a bicycle, and, more particularly, is for the wheel 25 of a bicycle, such as a mountain bicycle. The wheel 25 includes a plurality of spokes 26 supporting a generally circular rim 27. The rim 27 includes a bottom wall 28, a pair of opposing sidewalls 31, and opposing inwardly extending beads 32 on the ends of the sidewalls. The rim 27 is typically about 0.8 to 1.3 inches wide.

The wheel 25 also includes the bicycle inner tube 35 and the bicycle outer tire 37. The inner tube 35 is preferably formed from rubber and has a wall thickness in a range of about 0.03 to 0.12 inches. The illustrated outer tire 37 is preferably made from rubber and includes an outer tread portion defined by alternating knobs 38 and valleys 41. The outer tire 37 also includes a lower sidewall portion 42 terminating in an outwardly extending molded bead 43 as would be readily understood by those skilled in the art.

The illustrated tire liner 20 comprises a puncture-resistant flexible strip 46 to protect the inner tube 35 from puncture damage, and a plastic covering layer 45 spirally wound about the puncture-resistant flexible strip to cover at least the side edges 46a, 46b thereof. The puncture-resistant flexible strip 46 has a relatively abrasive surface especially at side edges so as to be capable of abrading the inner tube 35 upon relative motion therewith. Accordingly, the spiral wound covering layer 45 prevents abrading of the inner tube 35 which would otherwise occur from relative motion with the puncture-resistant flexible strip. For example, without the plastic covering layer 45, the puncture-resistant flexible strip 46 when formed of Kevlar may cause a flat in as little as two miles of riding.

The spiral wound covering layer 45 illustratively includes overlapping portions 46. Those of skill in the art will recognize that the adjacent portions may also be in abutting relation. The spiral would layer 45 may have a width of about ⅛ inch to 1 inch and, more preferably, about ½ inch, and be formed of a relatively thin, yet durable flexible plastic material, such as a vinyl. The covering layer 45 may be secured in position by an adhesive or by heat fusing overlapping portions together and to the adjacent portions of the puncture-resistant strip 46 as would be readily understood by those skilled in the art.

The protective liner 20 may have an overall length in a range of about 50 to 90 inches to thereby accommodate a range of typical bicycle wheel sizes as would be readily understood by those skilled in the art. Thus, the protective tire liner 20 may be overlapped at its ends. Accordingly, the covering layer 45 may also cover and protect at least the end edge exposed to the inner tube 35. The covering layer 45 may also cover both end edges 46c, 46d of the puncture-resistant strip 46 for ease of installation.

The protective liner 20 protects the inner tube 35 from puncture damage, such as from the illustrated thorn 55 (FIG. 2), and other sharp objects as are commonly encountered when mountain biking. In particular, as illustrated, because the protective liner 20 is not secured to or molded into the outer tire 37, it may more readily move relative to the outer tire to thereby deflect a sharp object tip, such as for the case of the illustrated thorn 55. In addition, the protective liner 20 may be reused in another bicycle wheel.

The protective liner 20 may also provide protection from a so-called "snake bite" tire puncture wherein the inner tube 35 is pressed onto the upper portions of the rim, such as by riding over a blunt object, and forms a pair of punctures at the points of contact. In other words, the protective tire liner 20 may cushion and spread the impact to reduce the likelihood of snake bite punctures.

The puncture-resistant strip 46 is preferably formed from a plurality of tightly woven fabric layers 47-49 arranged in stacked relation. Although only three fabric layers are illustrated, those of skill in the art will readily recognize that a larger or smaller number of layers may be used as long as sufficient puncture-resistance is provided. Each fabric layer 47-49, in turn, preferably comprises multifilament yarn having a relatively high modulus and a relatively high breaking strength.

The puncture-resistant strip 46 is preferably a thin, flexible, and lightweight material made from woven Kevlar yarn, for example, and may include an epoxy coated so as to be resistant to punctures. Unfortunately, these materials are typically abrasive especially when in relative motion with the rubber inner tube as for a bicycle wheel. The covering layer 45 is readily applied to protect the inner tube 35 from abrasion with the puncture-resistant strip 46.

For example, in the area of bulletproof vests, U.S. Pat. No. 5,565,264 discloses a suitable Kevlar material that may be used for the puncture-resistant strip 46. Of course, other flexible and puncture resistant fabric materials may also be used. U.S. Pat. Nos. 4,737,401 and 5,198,280 both to Harpell et al.; U.S. Pat. No. 4,868,040 to Hallal et al.; and U.S. Pat. No. 5,343,796 to Cordova et al. also disclose similar puncture-resistant materials. The entire disclosures of each of these patents is incorporated herein by reference.

Turning now additionally to FIGS. 5 and 6, another embodiment of the protective liner 60 in accordance with the invention is described. In the illustrated embodiment, the covering layer 45 is provided by a pair of opposing first and second flexible plastic layers 61, 62 covering opposing major first and second surfaces of the puncture-resistant flexible strip 46'. In this embodiment, the pair of opposing first and second flexible plastic layers 61, 62 preferably comprise respective outwardly extending portions which extend outwardly beyond side edges 46a', 46b' of the puncture-resistant strip 46'. These outwardly extending portions are joined together, such as using an adhesive or heat fusing the portions together. The outwardly extending portions of the plastic layers 61, 62 may extend about 0.1 to 0.8 inch beyond the edges of the puncture-resistant strip 46' to thereby provide a sufficient area for adequate bonding.

The plastic layers 61, 62 may be any of a number of flexible plastic materials that are readily joined together and which provide abrasion protection, especially at the side edges 46a', 46b' and also the end edges 46c', 46d'. The other elements of this embodiment indicated with prime notation are similar to those discussed above and need no further discussion.

Figure 7:
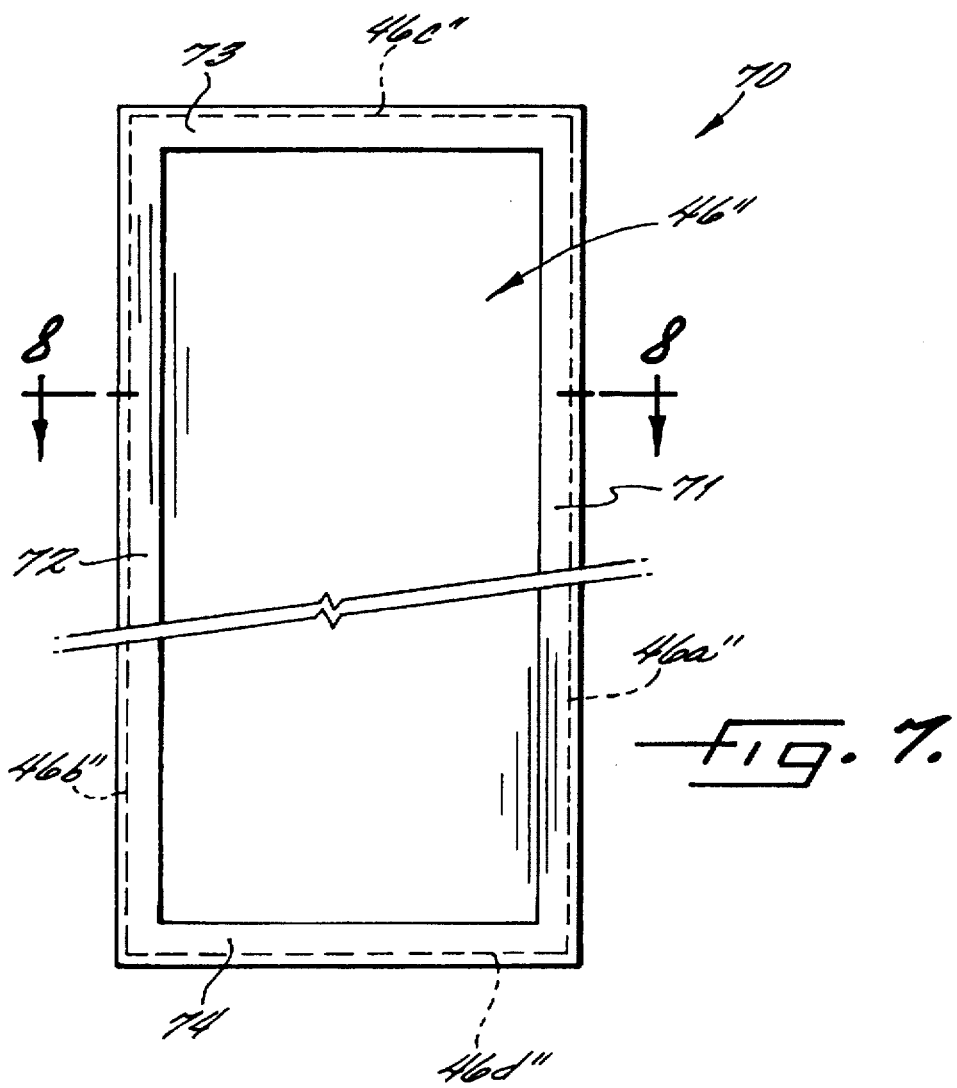
FIG. 7 is a plan view of a third embodiment of a protective tire liner in accordance with the invention.
Figure 8:
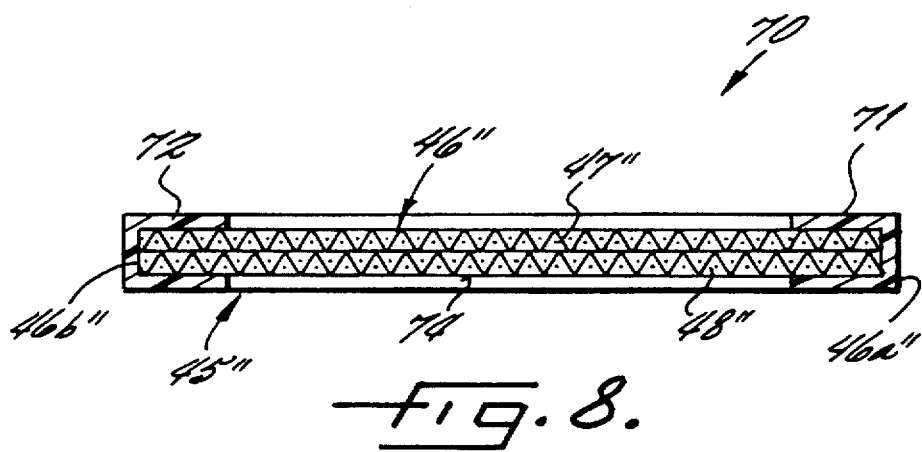
FIG. 8 is a cross-sectional view taken along lines 8—8 of FIG. 7.

Referring now more particularly to FIGS. 7 and 8, a third embodiment of a protective tire liner 70 in accordance with the invention is described. In the illustrated embodiment, the at least one covering layer is provided by a pair of flexible plastic strips 71, 72 being folded around respective side edges 46a", 46b" and adjacent portions of the puncture-resistant strip 46". Each plastic strip 71,72 is about ⅛ to 1 inch and more preferably about ½ inch. In addition, the end edges 46c", 46d" are also protected by respective folded flexible plastic strips 73, 74. The other elements similar to those described above are indicated by double prime notation and require no further discussion.

A method aspect according to the invention is for protecting a bicycle inner tube 35 for a bicycle wheel 25 comprising a generally circular bicycle rim 27, the bicycle inner tube being positioned around the bicycle rim, and a bicycle outer tire 37 covering the bicycle inner tube and secured to the bicycle rim. The method preferably comprises the steps of: forming a protective tire liner by providing a puncture-resistant flexible strip 46 having a relatively abrasive surface especially at side edges thereof 46a, 46b, and securing at least one covering layer 45 on the puncture-resistant flexible strip to cover at least the side edges thereof to prevent abrading. The method also preferably includes the step of positioning the protective tire liner 20 between the bicycle inner tube 35 and the bicycle outer tire 37.

In alternate embodiments of the protective tire liner, the at least one covering layer may be secured or formed in the puncture-resistant strip by extrusion or other coating techniques, as would be readily understood by those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A bicycle wheel comprising:
   a generally circular bicycle rim;
   a bicycle inner tube positioned around said bicycle rim;
   a bicycle outer tire covering said bicycle inner tube and being secured to said bicycle rim;
   a protective tire liner positioned between said bicycle inner tube and said bicycle outer tire, said protective tire liner comprising
      an elongate puncture-resistant flexible strip positioned to extend around a periphery of said inner tube to protect said inner tube from puncture damage, said puncture resistant flexible strip comprising a non-metallic fabric comprising an aramid yarn, said puncture-resistant flexible strip having a relatively abrasive surface especially at side edges thereof so as to be capable of abrading said inner tube upon relative motion therewith, and
      at least one elongate flexible covering strip connected to at least one respective major surface of said puncture-resistant flexible strip and extending outwardly beyond side edges thereof to prevent abrading of said inner tube which would otherwise occur from relative motion with said puncture-resistant flexible strip, said at least one elongate flexible covering strip comprising plastic.

2. A bicycle wheel according to claim 1 further comprising an adhesive securing said at least one covering strip to adjacent portions of said puncture-resistant strip.

3. A bicycle wheel according to claim 1 wherein said at least one covering strip comprises a pair of opposing first and second flexible plastic strips covering opposing major first and second surfaces of said puncture-resistant flexible strip.

4. A bicycle wheel according to claim 3 wherein said pair of opposing first and second flexible plastic strips comprise respective outwardly extending portions which extend outwardly beyond side edges of said puncture-resistant strip; and wherein the outwardly extending portions are joined together.

5. A bicycle wheel according to claim 4 wherein said pair of opposing first second flexible plastic strips comprise a heat fusible material; and wherein the outwardly extending portions are heat fused together.

6. A bicycle wheel according to claim 1 wherein said at least one covering strip comprises an extruded plastic strips.

7. A bicycle wheel according to claim 1 wherein said puncture-resistant flexible strip further defines opposing end edges; and wherein said at least one covering strip includes portions covering at least one end edge of said puncture-resistant flexible strip positioned adjacent said inner tube.

8. A bicycle wheel according to claim 1 wherein said puncture-resistant strip comprises a plurality of tightly woven fabric layers arranged in stacked relation.

9. A bicycle wheel according to claim 1 wherein said bicycle rim has a width at radially outermost portions thereof in a range of about 0.8 to 1.3 inches.

10. A bicycle wheel according to claim 1 wherein said inner tube comprises rubber, and has a wall thickness in a range of about 0.03 to 0.12 inches.

11. A bicycle wheel according to claim 1 wherein said outer tire comprises rubber having a tread pattern formed therein.

12. A method for protecting a bicycle inner tube for a bicycle wheel comprising a generally circular bicycle rim, the bicycle inner tube positioned around the bicycle rim, and a bicycle outer tire covering the bicycle inner tube and secured to the bicycle rim, the method comprising the steps of:

forming a protective tire liner by
      providing an elongate puncture-resistant flexible strip to protect the inner tube from puncture damage, said puncture resistant flexible strip comprising a non-metallic fabric comprising an aramid yarn, said puncture-resistant flexible strip having a relatively abrasive surface especially at side edges thereof so as to be capable of abrading the inner tube upon relative motion therewith, and
      securing at least one elongate flexible covering strip to at least one respective major surface of said puncture-resistant flexible strip so as to extend outwardly beyond side edges thereof to prevent abrading of said inner tube which would otherwise occur from relative motion with said puncture-resistant flexible strip, said at least one elongate flexible covering strip comprising plastic, and positioning the protective tire liner to extend around the periphery of the bicycle inner tube between the bicycle inner tube and the bicycle outer tire.

13. A method according to claim 12 wherein the step of securing comprises securing the at least one covering strip on the puncture-resistant flexible strip using an adhesive.

14. A method according to claim 12 wherein the step of securing comprises positioning a pair of opposing first and second flexible plastic strips covering opposing major first and second surfaces of the puncture-resistant flexible strip.

15. A method according to claim 14 wherein the step of positioning further comprises the step of positioning the pair of opposing first and second flexible plastic strips to have respective outwardly extending portions which extend outwardly beyond the side edges of the puncture-resistant strip.

16. A method according to claim 15 wherein the step of securing further comprises joining the outwardly extending portions together.

17. A method according to claim 16 wherein the pair of opposing first second flexible plastic strips comprise a heat fusible material; and wherein the step of joining the outwardly extending portions together comprises heat fusing the portions together.

18. A method according to claim 16 wherein the step of joining the outwardly extending portions together comprises adhesively joining the portions together.

19. A method according to claim 12 wherein the step of securing comprises extruding a plastic strip onto the puncture-resistant flexible strip.

20. A method according to claim 12 wherein the puncture-resistant flexible strip further defines opposing end edges; and further comprising the step of covering at least one end edge of the puncture-resistant flexible strip positioned adjacent the inner tube.

* * * * *